Jan. 7, 1936.  T. D. PARKIN ET AL  2,027,195
ELECTRICAL INSTRUMENT
Filed April 14, 1933  4 Sheets-Sheet 1

INVENTORS
THOMAS D. PARKIN
KEITH S. WEBB
BY
ATTORNEY

Jan. 7, 1936.   T. D. PARKIN ET AL   2,027,195
ELECTRICAL INSTRUMENT
Filed April 14, 1933   4 Sheets-Sheet 2

INVENTORS
THOMAS D. PARKIN
KEITH S. WEBB
BY
ATTORNEY

Jan. 7, 1936.  T. D. PARKIN ET AL  2,027,195
ELECTRICAL INSTRUMENT
Filed April 14, 1933  4 Sheets-Sheet 3

INVENTORS
THOMAS D. PARKIN
KEITH S. WEBB
BY
ATTORNEY

Jan. 7, 1936.  T. D. PARKIN ET AL  2,027,195
ELECTRICAL INSTRUMENT
Filed April 14, 1933  4 Sheets-Sheet 4

INVENTORS
THOMAS D. PARKIN
KEITH S. WEBB
BY
ATTORNEY

Patented Jan. 7, 1936

2,027,195

UNITED STATES PATENT OFFICE 2,027,195

ELECTRICAL INSTRUMENT

Thomas Dixon Parkin, Broomfield, near Chelmsford, and Keith Stuart Webb, London, England, assignors to Radio Corporation of America, a corporation of Delaware Application April 14, 1933, Serial No. 666,122
In Great Britain April 14, 1932

9 Claims. (Cl. 250—39)

This invention relates to electrical measuring instruments and more particularly to wave meters and has for its object to provide an improved instrument of the kind wherein there is employed a calibrated input circuit to which the quantity to be measured is applied, a thermionic valve having its input electrodes associated with said calibrated input circuit, and a measuring device actuated in dependence upon the change of output current from said thermionic valve.

According to this invention an electrical measuring instrument of the kind referred to comprises an input circuit, a thermionic valve with whose input electrodes said circuit is associated and three additional impedances which, with the internal impedance of said thermionic valve constitute a Wheatstone bridge, a measuring device being connected in one diagonal of the bridge and a source of potential in the other.

Figure 1:
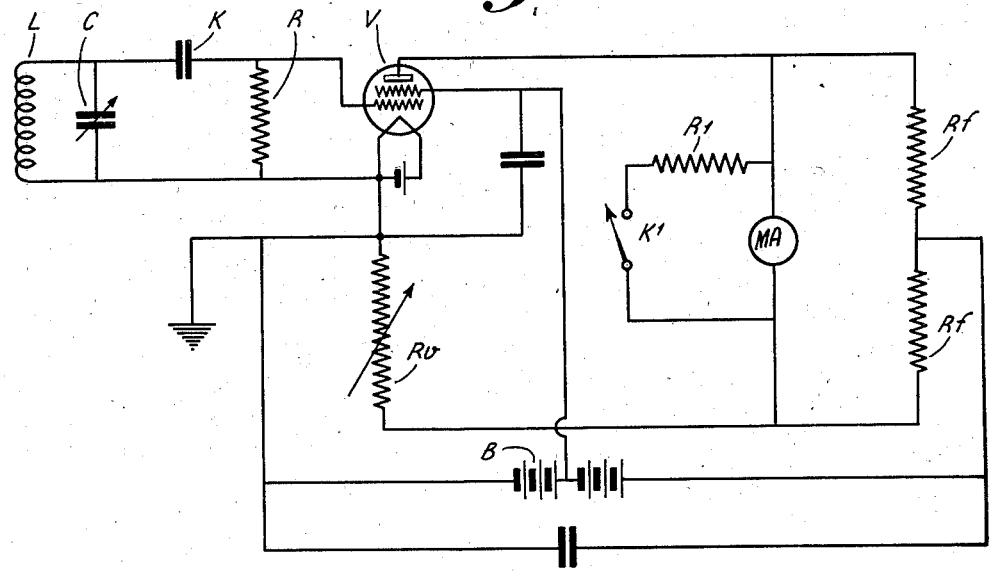
Figure 6:
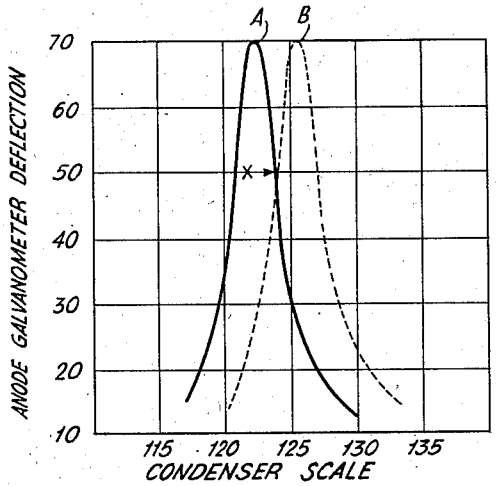
Figure 7:
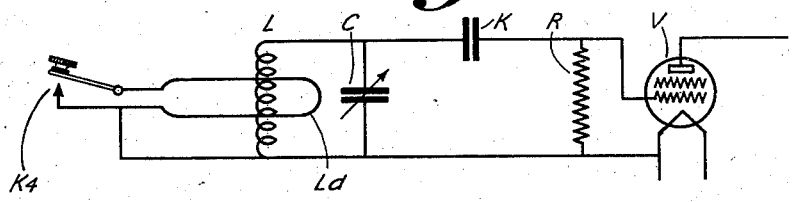

The invention is illustrated in the accompanying drawings, wherein Figure 1 illustrates a simple embodiment thereof and Figures 2, 3, 4 and 5 other embodiments. Figure 6 is a graphical representation explanatory of the operation of the invention, and Figures 7 to 11 inclusive show still further embodiments of the invention.

Referring to Figure 1, LC represents a calibrated tuned circuit to which the frequency to be measured is applied. The tuned circuit is coupled at one end through a condenser K to the control grid of a four electrode valve or so-called screened grid valve V. The other end of the tuned circuit LC is connected to the cathode of the valve V and a resistance R is connected between the control grid and cathode of said valve. The internal impedance of the valve forms one arm of a Wheatstone bridge whose other three arms are constituted by fixed resistances R$f$ which may be equal in value or unequal in value and a variable impedance R$v$. A key K' in series with a resistance R' and a galvanometer, milliammeter or like measuring device MA are connected in a diagonal of the bridge as shown, the key K' and the resistance R' (in series with one another) being in shunt with the device MA. A battery B is connected in the other diagonal of the bridge and part of this battery serves to apply potential to the screened grid of the valve, the whole battery serving to supply anode potential to the valve. The cathode of the valve may be earthed and suitable by-pass condensers connected across the anode battery and between the screened grid and the cathode of the valve.

The arrangement is operated as follows: Before actuating potentials are supplied to the valve, the key K' is closed. Actuating potentials are then applied to the valve and the resistance R$v$ is adjusted until the device MA is brought to zero reading. The key K' is then released and a final adjustment of the resistance R$v$ is made so that the instrument MA again gives zero reading. It will be seen that when a signal frequency to be measured is applied to the circuit LC the anode cathode resistance of the valve changes, the Wheatstone bridge is thrown out of balance, and a reading is given by the device MA. Owing to the fact that in the arrangement described the device MA is only required to handle currents due to unbalance of the bridge, i. e. due to a change brought about by the incidence of a signal upon the circuit LC the said device may be made very sensitive and a large reading for quite a small signal can be obtained as compared to known arrangements wherein the device MA is simply connected in the plate circuit of the valve V without any Wheatstone bridge circuit and so that the instrument has to carry the full anode current of the valve.

Of course, if desired, the screened grid can be energized in series with a resistance from the whole battery B instead of being, as shown, tapped thereon.

The key K' and resistance R' serve to protect the device MA.

Figure 2:
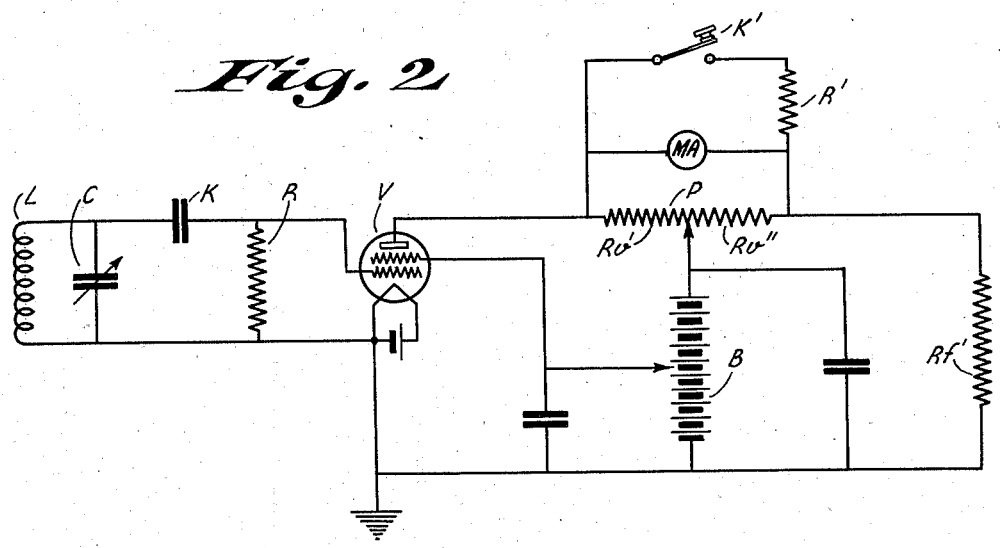

In the modification shown in Figure 2 the bridge circuit is slightly re-arranged and includes a fixed resistance R$f'$ about equal to the DC resistance of the valve V (when not influenced by the signals to be measured) and a pair of resistances R$v'$ and R$v''$ incorporated in a potentiometer having a movable tapping point P. The total resistance R$v'$+R$v''$ is chosen at a value suitable to the instrument MA to give good sensitivity; thus (to take a practical case) if MA is a milliammeter having an internal resistance of about 30 or 40 ohms R$v'$+R$v''$ would be chosen at about 2000 ohms. It will be seen that in Figure 2 the only handle necessary to adjust in using the device is that of the movable potentiometer point P.

The present invention is well adapted for use in connection with wave meters or frequency meters of the kind wherein a carefully calibrated variable circuit is connected in the input circuit of a detector valve with whose plate circuit the measuring instrument is associated, the tuned circuit including a variable condenser and the calibration chart of the meter consisting, for example, of a curve showing resonance frequencies plotted against condenser readings or of a tabular list of these co-ordinate values. Now the shape of a resonance curve of the tuned circuit, i. e. the curve in which instrument deflection is plotted (as ordinates) against frequency or condenser readings (as abscissae) is of necessity somewhat flat-topped and the discrimination of the meter (i. e. the sensitivity to frequency change) is rather small at or about resonance. For this reason it is, as is well known, of advantage to provide a small additional fixed reactance (usually a condenser) which can be added to or taken away from the tuned circuit so as to shift the reading from a resonance reading (where the curve is flat) to a reading below or above the correct resonance portion and in this way great accuracy and large discrimination may be obtained in all cases in which the frequency range spanned by the full range of variation of the variable condenser is small, say 1:1.2 (ratio of lower and upper limits of frequency in the range). Where, however, the range is large, say 1:2 then an additional fixed condenser is of little use since its effect is too small at one end of the range of adjustment of the variable condenser and too large at the other. An additional object of the present invention is to meet this difficulty and this object is achieved by providing a small variable de-tuning condenser which is driven with the main variable condenser and may conveniently be on the same shaft. This de-tuning condenser is of such law of variation and is so mounted relative to the main variable condenser that if it be switched into circuit the amount of depression or shift from the resonance point obtained by such switching is substantially the same whatever may be the position of the main variable condenser in its range.

Figure 3:
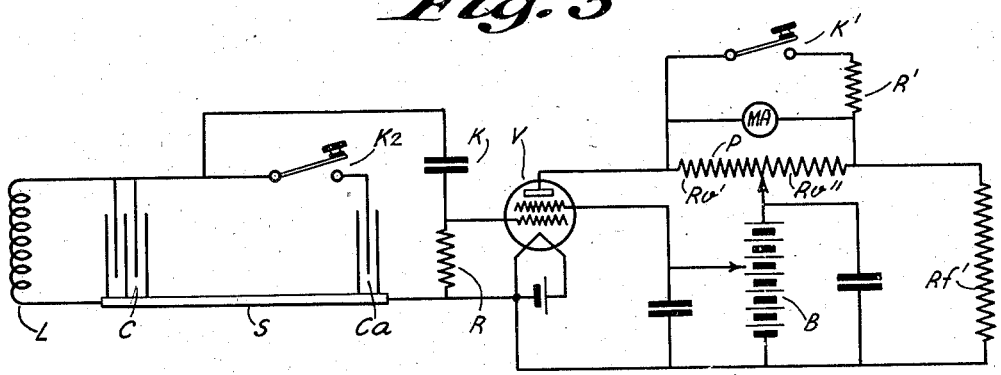

Figure 3 shows diagrammatically an arrangement similar to that shown in Figure 2, but wherein a detuning condenser, as above described, is provided. In Figure 3 the same references are employed as are employed in Figure 2 for corresponding parts.

In the accompanying Figure 3, C represents the main tuning condenser and $C_a$ represents the detuning condenser. The moving vanes of the two condensers C and $C_a$ which are mounted upon a common driving shaft S are electrically connected to one another and so arranged and positioned as to produce the result above mentioned. The cooperating fixed vanes are correspondingly shaped and positioned, but are insulated from one another a key $K_2$ being provided for connecting the fixed plates together when required.

Figure 4:
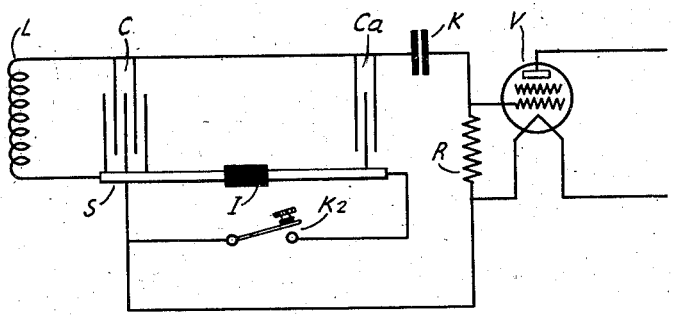
Figure 5:
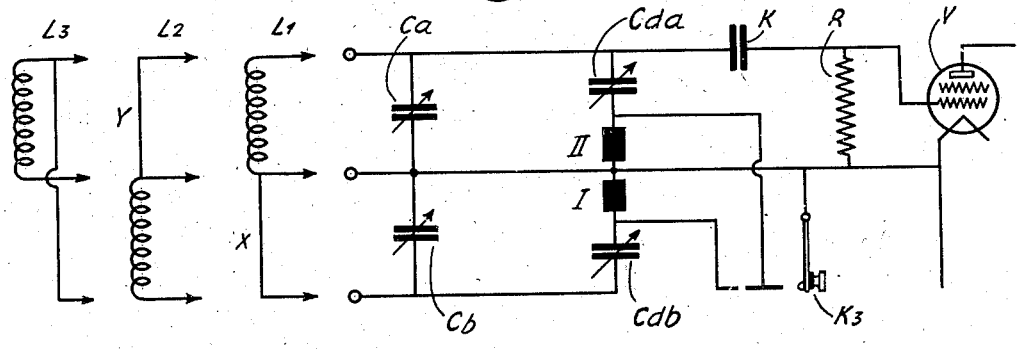

Figure 4 illustrates a slight modification of the arrangement of Figure 3, the modification consisting in arranging the fixed vanes of the condensers C and $C_a$ permanently directly connected to one another the moving vanes being as before mounted upon a common shaft which, however, contains an insulating member I, the moving vanes of the two condensers being adapted to be connected together when desired by a key $K_2$.

In cases where the condenser C is subdivided so as to consist in effect of a plurality of portions which can be switched in when desired (for example where a multi-stage frequency meter is required), a similar sub-divided de-tuning condenser may be similarly arranged. An example of this type is diagrammatically represented in the accompanying Figure 5 which like the accompanying Figure 2 illustrates only the input circuit for the valve V. In the case represented in Figure 5 the main condenser C is in effect sub-divided into two portions represented at $C_a$ and $C_b$ and the detuning condenser is similarly subdivided into two portions $C_{da}$ and $C_{db}$. The portions $C_a$ and $C_b$ are mounted on the same shaft with their moving vanes directly connected to one another and the fixed plates insulated from one another. The portions $C_{da}$ and $C_{db}$ are, as before, on the common shaft with the portions $C_a$ and $C_b$, but are insulated from one another and from the shaft by insulators represented at I and II. The fixed plates of the detuning condensers $C_{da}$ and $C_{db}$ are directly connected to the fixed plates of the respective portions of the main condenser $C_a$ $C_b$. A key $K_3$ is provided, as shown, one contact of the key being taken to the common connection for the portions $C_a$ and $C_b$ the other contacts being brought to the insulated moving systems of the portions $C_{da}$ and $C_{db}$. A plurality of plug-in inductances $L_1$ $L_2$ $L_3$ are provided and the whole arrangement is preferably such that suitable selection of the required portions of the condensers is made automatically upon plugging an inductance. For further description of an arrangement wherein there is provided a plurality of plug-in inductances constructed and arranged to be associated with a subdivided condenser in such manner that upon plugging in any particular inductance a particular tuning capacity value appropriate for securing operation over a particular range is selected, reference may be directed to the British specification No. 353,929. This multi-range construction forms, per se, no part of the present invention and need not be described in detail in the present specification. However, referring to Figure 5, if $C_a$ be a small portion and $C_b$ a large portion of the sub-divided main tuning condenser; if $C_{da}$ $C_{db}$ be in the correct ratio to $C_a$ and $C_b$ respectively; if $L_1$ be the smallest inductance, $L_2$ the medium inductance and $L_3$ the greatest inductance: then the whole arrangement is such that by inserting inductance $L_1$ the portion $C_a$ is automatically chosen and the portion $C_b$ shorted out; by inserting $L_2$ the portion $C_b$ is selected and the portion $C_a$ shorted; and by inserting $L_3$ the portions $C_a$ and $C_b$ are connected in parallel. Thus assuming $L_1$ to be plugged in, the portion $C_b$ is shorted out and the portion $C_{db}$ is insulated as also is the portion $C_{da}$, but upon depressing the key $K_3$ the portion $C_{db}$ is shorted out in parallel with the portion $C_b$ via the link X and the portion $C_{da}$ is placed in parallel with the portion $C_a$. Similarly if the inductance $L_2$ be inserted the portions $C_a$ and $C_{da}$ are put out of use and the portions $C_b$ and $C_{db}$ are utilized whilst when the largest inductance $L_3$ is plugged in the portions $C_a$ and $C_b$ are employed in parallel and the portions $C_{da}$ and $C_{db}$ are inserted in parallel with the main portions $C_a$ and $C_b$ upon depression of the key $K_3$.

As before the insertion of additional detuning capacities changes the position of the main condenser for obtaining resonance and the second position of resonance of this condenser can easily be found by retuning the condenser.

Referring to the graphical representation of Figure 6 of the accompanying drawings, in which figure the ordinates are readings given by the instrument $M_a$ and the abscissae scalar units for the main tuning condenser (the main tuning condenser being assumed to have maximum capacity at zero scale position) the whole instrument can be brought to resonance with a certain frequency at the point A as shown in Figure 6. If now an additional capacity be connected in parallel with the main tuning capacity it will be necessary to reduce the main capacity to recover resonance. This brings the scale position to the point B (Figure 6) and if now the added or detuning capacity be successively added and removed and the main capacity gradually changed a point will be found where the instrument Ma will not change its indication whether the extra capacity be included or excluded. This point is, of course, the intersection point X (Figure 6) at which point, of course, the slope of the resonance curve is much greater than at the top so that a much sharper indication is obtained.

Obviously, in place of employing detuning condensers detuning inductances may be resorted to. In practice, the use of detuning inductances is apt to be more simple since the necessity for careful shaping of detuning condenser plates in order to give substantially even detuning over a wide range is avoided. In fact it has been found possible in practice to use a single detuning inductance which can be associated with any of a plurality of main inductances adapted to open between them an operating range of from 20,000 k. c. to 90 k. c. or even wider. One arrangement utilizing a detuning inductance is diagrammatically illustrated in the accompanying Figure 7, the detuning inductance being represented by the turn Ld which is adapted to be shorted when required by the key K4. In practice it may be found more convenient rigidly to mount the inductance Ld independently of the main inductance L so that L may be changed for another inductance of large value without disturbing Ld. In operation the circuit LC is brought to resonance, the key K4 is depressed, the consequent second position of the condenser C for recovering resonance is observed, and by depressing and releasing K4 and gradually altering the position of C a point corresponding to the point X of Figure 6 is found, as above described, for the detuning condenser case. Obviously, if the maximum capacity of the main tuning capacity is obtained at zero value the point X will occur at a lower scale reading than the point A, i. e. for the detuning inductance case the broken curve of Figure 6 (having its summit at B) should be drawn to the left of the full curve (having its summit at A).

Figure 8:
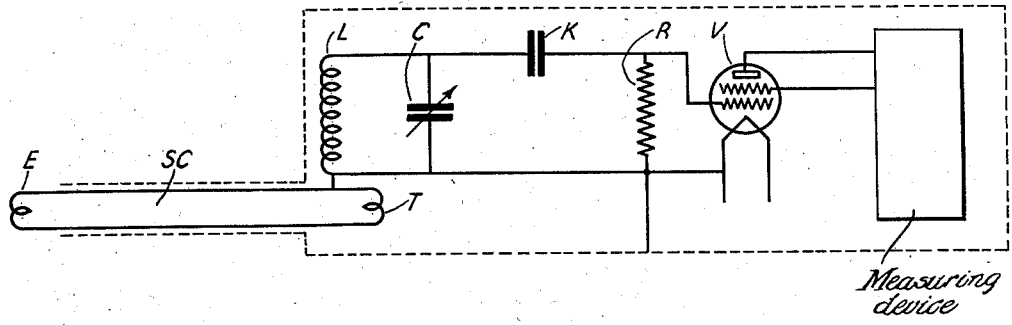

If desired, any of the preceding constructions may be modified by applying the frequency to be measured not directly to the calibrated tuned circuit, but by means of a small aperiodic circuit coupled thereto. Such an arrangement has the advantage of permitting of improved screening of the measuring or calibrated circuit. Figure 8 of the accompanying drawings shows a simple arrangement of this kind, the energy to be measured being applied to the aperiodic coil E and thence via a screened cable SC to another aperiodic coil T which is coupled to the coil L and, like the coil L, is situated within a screening case which houses the whole instrument proper.

Figure 9:
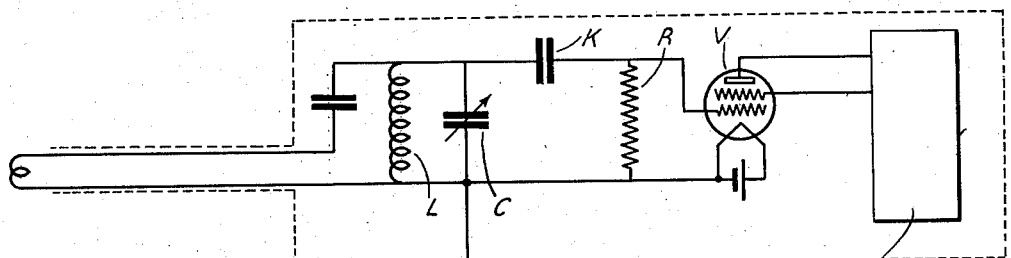
Figure 10:
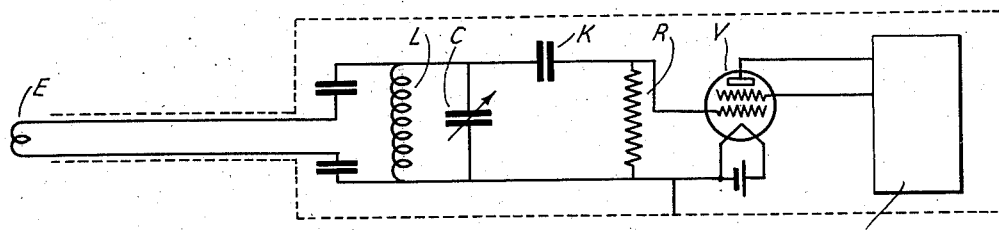

Other arrangements wherein energy of the frequency to be measured is applied by means of an aperiodic coil to the calibrated circuit LC are illustrated in Figures 9 and 10, respectively. It is thought that the nature of the arrangement shown in Figures 9 and 10 will be obvious from the said figures without further description. In Figures 8, 9 and 10 the apparatus following the valve V is represented simply by a rectangle.

Figure 11:
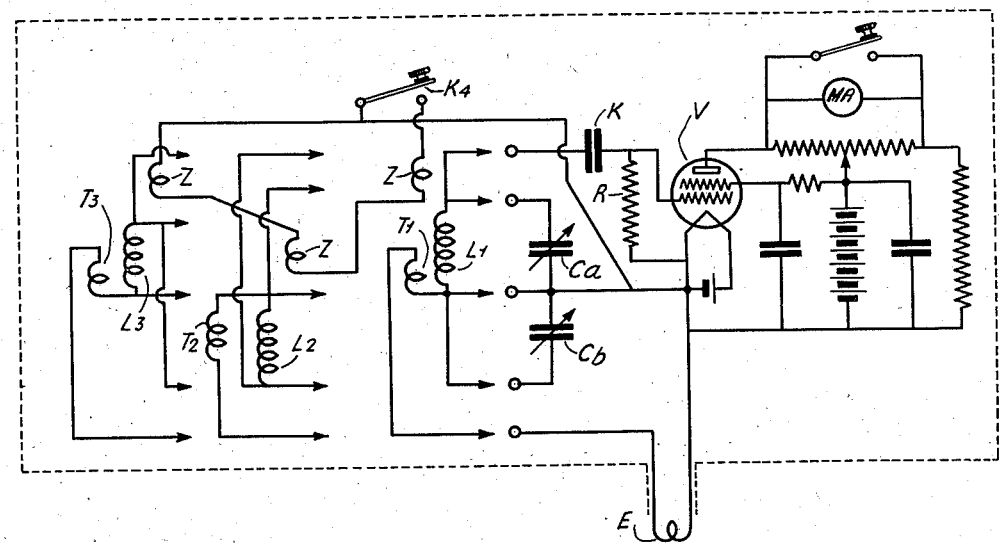

The accompanying Figure 11 illustrates a multi-range instrument adapted to cover a wide range of frequency and having a number of interchangeable plug-in coils $L_1$ $L_2$ $L_3$ cooperating with subdivided condensers as hereinbefore set forth. In the instrument of Figure 11 inductive detuning is employed and the calibrated circuit is inductively coupled to receive the frequency to be measured. Z is a detuning coil common to all the measuring circuits and E is a common aperiodic pick-up coil. $T_1$ $T_2$ $T_3$ are cooperating aperiodic coils corresponding to the coil T of Figure 8.

The invention is, of course, not limited merely to the use of four electrode valves which are resistance-capacity coupled as shown for triodes can, if desired, be employed, and any convenient form of coupling between the calibrated circuit and the valve may be utilized.

Obviously if the instrument MA is of other than the central zero type care must be taken to connect it in circuit the right way as regards its polarity.

What is claimed is:

1. An electrical measuring circuit comprising a calibrated input circuit, a thermionic valve including an anode, a cathode and a grid electrode with whose grid and cathode electrodes said circuit is coupled, and three additional impedances which, with the internal impedance of the said thermionic valve constitute a Wheatstone bridge, a measuring device being connected in one diagonal of the bridge and a source of potential for said anode in the other.

2. A wave meter wherein the frequency of a source of alternating current energy is measured by means including a calibrated tuned circuit characterized in that there is provided in parallel with one of the elements of said tuned circuit a detuning reactance and means for switching said detuning reactance effectively in and out of circuit with said element.

3. An electrical measuring circuit comprising a calibrated input circuit, a single thermionic valve having an input and an output electrode and with whose input electrode said circuit is coupled, and three impedances which, with the internal impedance of said thermionic valve, constitute a Wheatstone bridge, a measuring device connected in one diagonal of the bridge and a source of potential for said output electrode in the other.

4. An electrical measuring circuit comprising a calibrated tunable input circuit, a single thermionic valve including anode, cathode and grid electrodes with whose cathode and grid said circuit is coupled, and three resistances which, with the internal impedance of the single thermionic valve, constitute a Wheatstone bridge, and a measuring device connected in one diagonal of the bridge and a source of potential for at least one of said electrodes in the other.

5. An electrical measuring circuit comprising a calibrated input circuit, a thermionic valve having input and output electrodes and with whose input electrodes said circuit is coupled, and three additional impedances which, with the internal impedance of the said thermionic valve, constitute a Wheatstone bridge, a measuring device being connected in one diagonal of the bridge and a source of potential in the other, two of said impedances being combined in a single impedance having a potentiometer tapping point thereon, said potentiometer tapping point constituting one apex of a diagonal of the bridge.

6. An electrical measuring circuit comprising a calibrated input circuit, a thermionic valve having an anode, a cathode and a grid with whose cathode and grid said circuit is coupled, and three additional impedances which, with the internal impedance of the said thermionic valve, constitute a Wheatstone bridge, a measuring device being connected in one diagonal of the bridge and a source of potential for said anode in the other, said calibrated input circuit being tunable by means of a calibrated condenser, and an aperiodic circuit coupled to said calibrated input circuit, said aperiodic circuit being adapted to be coupled to the source of energy whose frequency is to be measured.

7. A wave meter wherein the frequency of a source of alternating current energy is measured by means including a calibrated tuned circuit comprising inductance and capacitance, characterized in this, that there is provided in circuit with the capacitance of said tuned circuit a detuning condenser and means for switching said detuning condenser effectively in and out of circuit with said capacitance, said detuning condenser being uni-controlled with said calibrated tuned circuit.

8. A wave meter wherein the frequency of a source of alternating current energy is measured by means including a calibrated tuned input circuit comprising a tuning condenser and an inductance in parallel, characterized in this, that there is provided in parallel with said tuned input circuit a detuning condenser mounted on the same shaft as said tuning condenser of said input circuit, and means for switching said detuning condenser effectively in and out of use.

9. A wave meter wherein the frequency of a source of alternating current energy is measured by means including a calibrated tuned circuit, characterized in that there is provided in circuit with one of the elements of said tuned circuit a detuning inductance and means for switching said detuning inductance effectively in and out of use.

THOMAS DIXON PARKIN.
KEITH STUART WEBB.